(12) United States Patent
Oulès

(10) Patent No.: US 12,482,058 B1
(45) Date of Patent: Nov. 25, 2025

(54) IDENTIFICATION OF VISUAL FEATURES FOR APPLYING EFFECT

(71) Applicant: GoPro, Inc., San Mateo, CA (US)

(72) Inventor: Guillaume Oulès, Paris (FR)

(73) Assignee: GoPro, Inc., San Mateo, CA (US)

( * ) Notice: Subject to any disclaimer, the term of this patent is extended or adjusted under 35 U.S.C. 154(b) by 418 days.

(21) Appl. No.: 18/192,472

(22) Filed: Mar. 29, 2023

(51) Int. Cl.
　　*G06T 3/40*　　(2024.01)
　　*G06V 10/40*　　(2022.01)
　　*H04N 5/262*　　(2006.01)

(52) U.S. Cl.
　　CPC ............... *G06T 3/40* (2013.01); *G06V 10/40* (2022.01); *H04N 5/2621* (2013.01)

(58) Field of Classification Search
　　CPC ......... G06T 3/40; G06V 10/40; H04N 5/2621
　　See application file for complete search history.

(56) References Cited

U.S. PATENT DOCUMENTS

| | | | | | |
|---|---|---|---|---|---|
| 10,742,882 | B1* | 8/2020 | Oulès | ................... | H04N 23/698 |
| 11,373,687 | B1* | 6/2022 | Oulès | ................... | G11B 27/031 |
| 11,955,142 | B1* | 4/2024 | Oulès | ................... | G11B 27/036 |
| 2010/0083114 | A1* | 4/2010 | Ubillos | ............... | H04N 23/6811 |
| | | | | | 715/719 |
| 2014/0240553 | A1* | 8/2014 | Pylvanainen | ........ | H04N 5/2628 |
| | | | | | 348/240.2 |
| 2015/0036921 | A1* | 2/2015 | Lu | ........................ | G06T 7/0002 |
| | | | | | 382/164 |
| 2015/0363635 | A1* | 12/2015 | Suri | ......................... | G06T 7/11 |
| | | | | | 386/241 |
| 2016/0094765 | A1* | 3/2016 | Ardö | ....................... | H04N 7/183 |
| | | | | | 348/208.6 |
| 2017/0285916 | A1* | 10/2017 | Xu | ........................... | G06T 11/60 |
| 2017/0302719 | A1* | 10/2017 | Chen | ........................ | H04L 65/61 |
| 2023/0153941 | A1* | 5/2023 | Jin | ......................... | H04N 23/95 |
| | | | | | 382/100 |
| 2023/0164442 | A1* | 5/2023 | Kim | ....................... | H04N 23/69 |
| | | | | | 348/240.99 |
| 2025/0030812 | A1* | 1/2025 | Marcin | ................... | G06T 7/248 |

* cited by examiner

*Primary Examiner* — Aaron W Carter
(74) *Attorney, Agent, or Firm* — Esplin & Associates, PC

(57) ABSTRACT

Visual content of a video may depict a target. Multiple stable features of the target, such as multiple stable parts of the target and/or multiple stable properties (e.g., dimensions, center) of the target may be identified for use in applying a visual effect. Application of the visual effect to the video may be improved by use of the multiple stable features of the target.

20 Claims, 5 Drawing Sheets

IDENTIFICATION OF VISUAL FEATURES FOR APPLYING EFFECT

FIELD

This disclosure relates to identification of multiple stable features of a target depicted within visual content to apply visual effect to the visual content.

BACKGROUND

A video may include depiction of a thing. A user may wish to apply a visual effect that targets the thing depicted within the video. Tracking of the target with the video may be inaccurate or noisy due to movement of the target and/or change in shape and/or size of the target. Inaccurate or noisy tracking of the target may result in improper application of the visual effect.

SUMMARY

This disclosure relates to identifying visual features for applying effects. Video information and/or other information may be obtained. The video information may define a video. The video may have a progress length. The video may include visual content viewable as a function of progress through the progress length. A target depicted within the visual content may be identified. Multiple stable features of the target depicted within the visual content may be identified. A visual effect may be applied to the visual content based on the multiple stable features of the target and/or other information.

A system for identifying visual features for applying effects may include one or more electronic storage, processor, and/or other components. The electronic storage may store video information, information relating to a video, information relating to a target, information relating to stable features of the target, information relating to a visual effect, and/or other information.

The processor(s) may be configured by machine-readable instructions. Executing the machine-readable instructions may cause the processor(s) to facilitate identifying visual features for applying effects. The machine-readable instructions may include one or more computer program components. The computer program components may include one or more of a video component, a target component, a stable feature component, a visual effect component, and/or other computer program components.

The video component may be configured to obtain video information and/or other information. The video information may define a video. The video may have a progress length. The video may include visual content viewable as a function of progress through the progress length. The visual content may include depiction of a scene including one or more targets.

The target component may be configured to identify one or more targets depicted within the visual content. A target depicted within the visual content may be identified based on analysis of the visual content, user selection, and/or other information.

The stable feature component may be configured to identify multiple stable features of the target(s) depicted within the visual content. The multiple stable features of the target may include multiple stable properties of the target, multiple stable parts of the target, and/or other stable features of the target.

In some implementations, the multiple stable properties of the target may include a vertical dimension, a horizontal dimension, a top-bottom bound dimension, a left-right bound dimension, and/or other dimension of the target. The multiple stable properties of the target may further include a center of the target.

In some implementations, the multiple stable parts of the target may be identified based on stability of distances between different stable parts of the target and/or other information. The multiple stable parts of the targets may be identified further based on lengths of the distances between the different stable parts of the target.

The visual effect component may be configured to apply one or more visual effects to the visual content. The visual effect(s) may be applied to the visual content based on the multiple stable features of the target(s) and/or other information.

In some implementations, a visual effect may include a dolly zoom effect. The dolly zoom effect may maintain size and/or position of the target(s) across multiple frames of the video while changing field of view of the scene depicted across the multiple frames of the video.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

Figure 1:
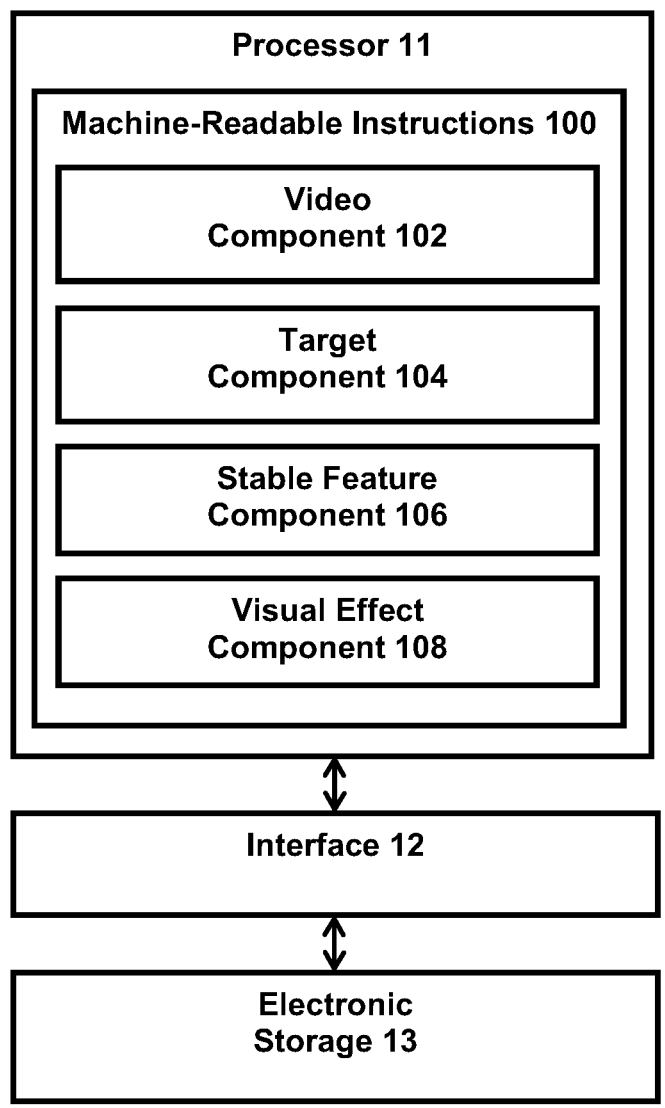
FIG. 1 illustrates a system for identifying visual features for applying effects.

FIG. 1 illustrates a system 10 for identifying visual features for applying effects. The system 10 may include one or more of a processor 11, an interface 12 (e.g., bus, wireless interface), an electronic storage 13, and/or other components. Video information and/or other information may be obtained by the processor 11. The video information may define a video. The video may have a progress length. The video may include visual content viewable as a function of progress through the progress length. A target depicted within the visual content may be identified by the processor 11. Multiple stable features of the target depicted within the visual content may be identified by the processor 11. A visual effect may be applied to the visual content by the processor 11 based on the multiple stable features of the target and/or other information.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store video information, information relating to a video, information relating to a target, information relating to stable features of the target, information relating to a visual effect, and/or other information.

Content of one or more videos may be referred to as video content. Video content may have a progress length. That is, a video may include video content having a progress length. A progress length may be defined in terms of time durations and/or frame numbers. For example, video content of a video may have a time duration of 60 seconds. Video content of a video may have 1800 video frames. Video content having 1800 video frames may have a play time duration of 60 seconds when viewed at 30 frames per second. Other progress lengths, time durations, and frame numbers are contemplated.

Video content may include visual content, audio content, and/or other content. For example, video content may include visual content viewable as a function of progress through the progress length of the video content, audio content playable as a function of progress through the progress length of the video content, and/or other content that may be played back as a function of progress through the progress length of the video content.

Visual content may refer to content of image(s), video frame(s), and/or video(s) that may be consumed visually. For example, visual content may be included within one or more images and/or one or more video frames of a video. The video frame(s) may define/contain the visual content of the video. That is, video may include video frame(s) that define/contain the visual content of the video. Video frame (s) may define/contain visual content viewable as a function of progress through the progress length of the video content. A video frame may include an image of the video content at a moment within the progress length of the video. As used herein, term video frame may be used to refer to one or more of an image frame, frame of pixels, encoded frame (e.g., I-frame, P-frame, B-frame), and/or other types of video frame. Visual content may be generated based on light received within a field of view of a single image sensor or within fields of view of multiple image sensors.

Visual content (of image(s), of video frame(s), of video (s)) with a field of view may be captured by an image capture device during a capture duration. A field of view of visual content may define a field of view of a scene captured within the visual content. A capture duration may be measured/defined in terms of time durations and/or frame numbers. For example, visual content may be captured during a capture duration of 60 seconds, and/or from one point in time to another point in time. As another example, 1800 images may be captured during a capture duration. If the images are captured at 30 images/second, then the capture duration may correspond to 60 seconds. Other capture durations are contemplated.

Visual content may be stored in one or more formats and/or one or more containers. A format may refer to one or more ways in which the information defining visual content is arranged/laid out (e.g., file format). A container may refer to one or more ways in which information defining visual content is arranged/laid out in association with other information (e.g., wrapper format). Information defining visual content (visual information) may be stored within a single file or multiple files. For example, visual information defining an image or video frames of a video may be stored within a single file (e.g., image file, video file), multiple files (e.g., multiple image files, multiple video files), a combination of different files, and/or other files. In some implementations, visual information may be stored within one or more visual tracks of a video.

Audio content may refer to media content that may be consumed as one or more sounds. Audio content may include one or more sounds stored in one or more formats/containers, and/or other audio content. Audio content may include one or more sounds captured by one or more sound sensors (e.g., microphone). Audio content may include audio/sound captured during the capture of the visual content and/or audio/sound provided as an accompaniment for the visual content. Audio content may include one or more of voices, activities, songs, music, and/or other audio/sounds. Audio content may include sounds captured by a single sound sensor or an array of sound sensors. The audio content may be captured by one or more sound sensors of the image capture device (e.g., microphone(s) of and/or coupled to the image capture device) and/or may be captured by one or more sound sensors separate from the image capture device (e.g., microphone(s) separate from the image capture device).

Audio content may be stored in one or more formats and/or one or more containers. Information defining audio content (audio information) may be stored within a single file or multiple files. For example, audio information defining sound recorded with frames of a video may be stored within a single file (e.g., audio file, video file), multiple files (e.g., multiple audio files, multiple video files), a combination of different files, and/or other files. Audio information may be stored with and/or separate from the video information. In some implementations, audio information may be stored within one or more audio tracks of a video.

A visual effect may be applied to the visual content to manipulate/change the visual content. A visual effect may refer to manipulation of visual content that changes one or more characteristics of the visual content. A visual effect be applied based on a target depicted within the visual content. For example, a visual effect may make different changes to different spatial extents of the visual content, depending on whether the extents depict the target or do not depict the target. Accurate application of a visual effect to the visual content may require accurate tracking of the target within the visual content. Tracking the target within the visual content may include determining where the target is depicted within the visual content (e.g., location, size, shape, etc.) at different moments within the video.

Inaccurate or noisy tracking of the target may result in improper application of the visual effect, where visual characteristic changes are made to wrong extents of the visual content. For example, a target in a video may include a person riding a vehicle. Noise/error in tracking may be caused by change in where the person riding the vehicle is depicted within the visual content (e.g., the person riding the vehicle being depicted at the center of the field of view of the visual content at one moment in the video and at non-center of the field of view of the visual content at another moment in the video), and/or by change in size and/or shape of the person riding the vehicle (e.g., the person riding the vehicle in an upright position at one moment in the video and the person riding the vehicle in a standing or a crouched position at another moment in the video). The error in tracking may result in the visual effect not being applied to the target or being applied to non-target portion of the visual content. For example, a bounding box may be used to track the size and/or position of the target. Changes in the target may result in noise/error in the bounding box, and use of the noisy/erroneous bounding box may result in the visual effect being inaccurately applied to the visual content.

The present disclosure provides improvements to tracking of targets for visual effects by identifying multiple stable features of the target and using the multiple stable features of the target to apply visual effects. The multiple stable features of the target may be tracked independently for different moments in the video, and the multiple stable features of the target may be used to used determine where the visual effect will be applied. For example, the multiple independently tracked stable features of the target may be used to determine the center, size, and/or shape of the region that will be manipulated by a visual effect. The multiple independently tracked stable features of the target may be used to determine the center, size, and/or shape of the region that will be manipulated one way by a visual effect, with the rest of the visual content being manipulated in a different way by the visual effect. Use of the multiple stable features may result in more accurate application of the visual effect, where visual characteristic changes are made to target extents of the visual content.

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate identifying visual features for applying effects. The machine-readable instructions 100 may include one or more computer program components. The machine-readable instructions 100 may include one or more of a video component 102, a target component 104, a stable feature component 106, a visual effect component 108, and/or other computer program components.

The video component 102 may be configured to obtain video information and/or other information. Obtaining video information may include one or more of accessing, acquiring, analyzing, determining, examining, identifying, loading, locating, opening, receiving, retrieving, reviewing, selecting, storing, and/or otherwise obtaining the video information. The video component 102 may obtain video information from one or more locations. For example, the video component 102 may obtain video information from a storage location, such as the electronic storage 13, electronic storage of information and/or signals generated by one or more sensors, electronic storage of a device accessible via a network, and/or other locations. The video component 102 may obtain video information from one or more hardware components (e.g., an image sensor) and/or one or more software components (e.g., software running on a computing device).

In some implementations, the video component 102 may obtain video information based on user interaction with a user interface/application (e.g., video editing application, video player application), and/or other information. For example, a user interface/application may provide option(s) for a user to apply visual effects to a video. The video information defining a video may be obtained based on the user's selection of the video through the user interface/video application. Other selections of video for retrieval of video information are contemplated.

The video information may define a video. The video may have a progress length. The video may include visual content, audio content, and/or other content. The video may include visual content, audio content, and/or other content viewable/playable as a function of progress through the progress length. The video information may define a video by including information that defines one or more content, qualities, attributes, features, and/or other aspects of the video/video content. For example, the video information may define video content by including information that makes up the content of the video and/or information that is used to determine the content of the video. For instance, the video information may include information that makes up and/or is used to determine the arrangement of pixels, characteristics of pixels, values of pixels, and/or other aspects of pixels that define visual content of the video. The video information may include information that makes up and/or is used to determine audio content and/or other content of the video. Other types of video information are contemplated.

The visual content may have a field of view. The field of view of the visual content may refer to a portion of a scene that was observed by one or more image capture devices in capturing the visual content. The field of view may refer to the extent (e.g., angle, size) of the scene that is captured within the visual content.

In some implementations, the video may include a spherical video. The field of view of the visual content of a spherical video may include a spherical field of view. Spherical field of view may include full spherical field of view (360 degrees of capture) or partial spherical field of view (less than 360 degrees of capture). The visual content may be viewable from a point of view as the function of progress through the progress length. Spherical video content may include and/or may be associated with spatial sounds.

Video information may be stored within a single file or multiple files. For example, video information defining video content may be stored within a video file, multiple video files, a combination of different files (e.g., a visual file and an audio file), and/or other files. Video information may be stored in one or more formats or containers. A format may refer to one or more ways in which the information defining a video is arranged/laid out (e.g., file format). A container may refer to one or more ways in which information defining a video is arranged/laid out in association with other information (e.g., wrapper format).

The visual content may include depiction of a scene including one or more things. A scene may refer to a place and/or a location in which the image capture device is located while capturing visual content. A scene may include one or more portions of a place and/or a location at which the image capture device is directed during capture of the visual content. A scene may include one or more portions of a place and/or a location that are within the field of view of the image capture device during capture of the visual content. A scene may include static things (e.g., environment, non-moving objects) and/or dynamic things (e.g., moving objects).

Figure 3:
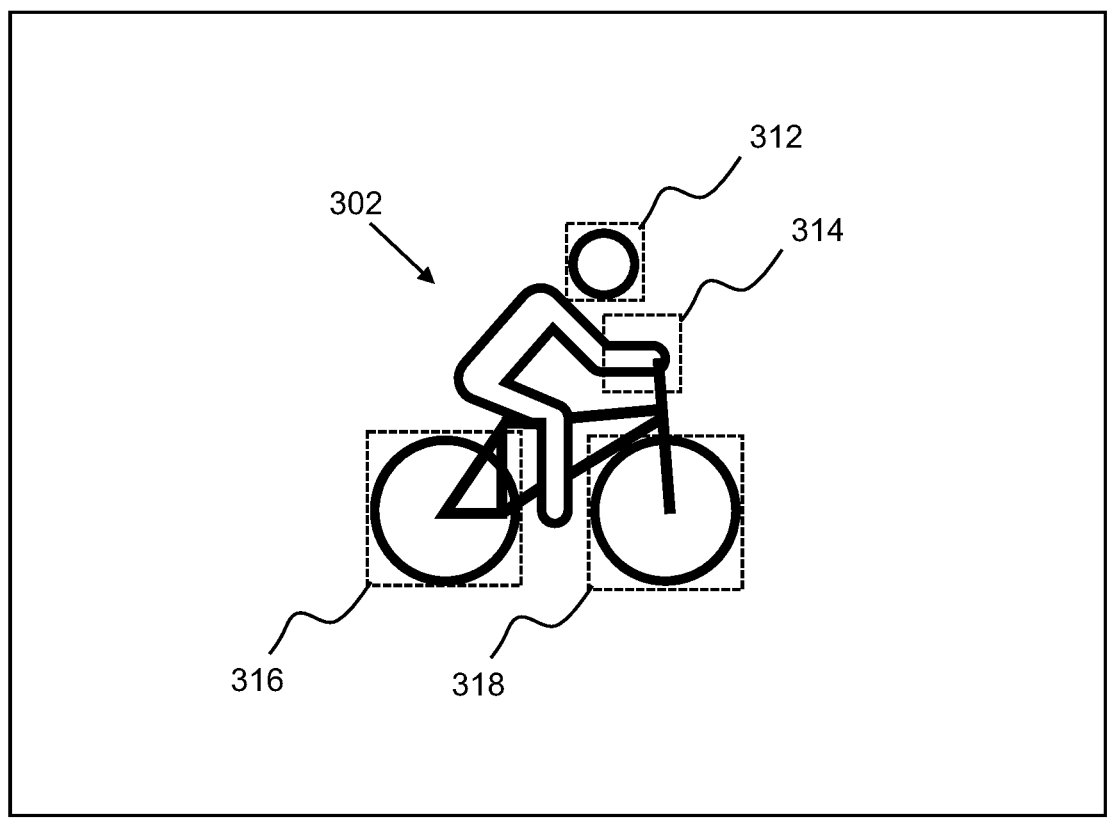
FIG. 3 illustrates example stable parts of a target.

One or more video frames of a video may include depiction of a scene. One or more video frames of a video may include depiction of one or more things. The visual content may include depiction of a living thing and/or a non-living thing. The visual content may include depiction of the entirety of a thing or one or more parts of the thing. For example, the visual content may include depiction of a person or parts of a person (e.g., a person's face). For instance, the visual content of the video may be captured by an image capture device that includes the person within the field of view of the image capture device. FIG. 3 illustrates an example person on a bicycle 302 depicted within visual content 300 of a video.

The depiction of a thing within the visual content may move during the progress length of the video. For example, the thing and/or the image capture device capturing the video may move during capture of the video. Such movement may cause the depiction of the thing to change within the field of view of the visual content. For example, location, size, and/or the shape of the thing may change due to the movement of the thing and/or the movement of the image capture device.

The target component 104 may be configured to identify one or more targets depicted within the visual content. Identifying a target depicted within the visual content may include ascertaining, detecting, determining, establishing, finding, indicating, locating, obtaining, and/or otherwise identifying the target depicted within the visual content. Identifying a target depicted within the visual content may include identifying type, location, size, shape, and/or other characteristics of the target within the visual content. The target component 104 may be configured to identify one or more targets depicted within the visual content as a function of progress through the progress length of the video. The target(s) may be identified within different video frames of the video.

A target may refer to a thing that is selected for application of a visual effect. A target may refer to a particular thing that is distinguished from other things for application of a visual effect. A target may refer to a thing that provides a reference for application of a visual effect. A target may include a thing (living thing, non-living thing) within the scene captured within the visual content. A target may include a combination of things (e.g., a person on a bicycle). A target may include a combination of living thing, a combination of non-living thing, or a combination of living thing(s) and non-living thing(s). For example, referring to FIG. 3, the target within the visual content 300 may include the person on the bicycle 302. Other types of targets are contemplated.

A target depicted within the visual content may be identified based on analysis of the visual content, user selection, and/or other information. Analysis of visual content may include analysis of the content of the video frames of the video, such as analysis of the arrangement of pixels, characteristics of pixels, values of pixels, and/or other aspects of pixels of the visual content. Analysis of visual content may include use of computer vision and/or other object detection, recognition, and/or segmentation techniques to identify a target depicted within the visual content. User selection of the target may refer to user input that identifies a particular thing depicted within the visual content as a target. For example, a user may interact with a user interface to identify a grouping of pixels (e.g., by drawing a shape around the pixels, by marking/tagging the pixels) as depicting a target. Other identification of target(s) depicted within the visual content is contemplated.

The stable feature component 106 may be configured to identify multiple stable features of the target(s) depicted within the visual content. Identifying a stable feature of a target depicted within the visual content may include ascertaining, detecting, determining, establishing, finding, indicating, locating, obtaining, and/or otherwise identifying the stable feature of the target depicted within the visual content. Identifying a stable feature of a target depicted within the visual content may include identifying type, location, size, shape, and/or other characteristics of the stable feature of the target depicted within the visual content. Identifying a stable feature of a target depicted within the visual content may include identifying a bounding shape (e.g., bounding box, bounding circle) and/or a region of interest that includes the stable feature. The stable feature component 106 may be configured to identify multiple stable features of the target(s) depicted within the visual content as a function of progress through the progress length of the video. The stable features of the target(s) may be identified within different video frames of the video. The stable features of the target(s) may be identified independently from other stable features of the target(s). Individual stable features may be identified on their own. In some implementations, a specific number of stable features of the target may be identified. For example, the stable feature component 106 may identify two stable features for use in applying visual effect. In some implementations, a variable number of stable features of the target may be identified. For example, the stable feature component 106 may identify two or more stable features for use in applying visual effect. Identification of other number of stable features is contemplated.

A stable feature of a target may refer to a feature of the target that does not change/deform over time (over the entire progress length of the video, over one or more segments of the progress length of the video), does not change/deform more than a threshold amount over time, and/or changes/deforms less than other features of the target over time. A stable feature of a target may refer to a part (a piece or a segment of the target) and/or a combination of parts of the target that does not change/deform over time. A stable feature of a target may refer to a part and/or a combination of parts of the target that does not change/deform more than a threshold amount over time. A stable feature of a target may refer to a part and/or a combination of parts of the target that changes/deforms less than other parts and/or other combinations of the parts of the target over time.

A stable feature of a target may refer to a property (an attribute, a quality, and/or a characteristic) and/or a combination of properties of the target does not change/deform over time. A stable feature of a target may refer to a property and/or a combination of properties of the target that does not change/deform more than a threshold amount over time. A stable feature of a target may refer to a property and/or a combination of properties of the target that changes/deforms less than other properties and/or other combinations of the properties of the target over time.

For example, visual content of the video may be analyzed at different moments in the video to determine how much different parts, combination of different parts, different properties, and/or combination of different properties of the target changes (e.g., in location, size, and/or shape), and those features with the smallest amount of changes may be selected as stable features of the target. Usage of such stable features in applying visual effect may result in more accurate application of the visual content.

A stable feature of a target depicted within the visual content may be identified based on analysis of the visual content, user selection, and/or other information. Analysis of visual content may include analysis of the content of the video frames of the video, such as analysis of the arrangement of pixels, characteristics of pixels, values of pixels, and/or other aspects of pixels of the visual content. For example, the target may be divided into a certain number of subzones and the subzones with highest/high entropy (e.g., entropy value higher than a threshold amount) may be identified as a stable feature. Analysis of visual content may include use of computer vision and/or other object detection, recognition, and/or segmentation techniques to identify a stable feature of a target depicted within the visual content. For example, objection detection may be used to identify semantically identifiable things (e.g., wheels, helmet, handlebar, etc.). User selection of the stable feature may refer to user input that identifies a particular feature (e.g., dimension, center, part) of a thing depicted within the visual content as a stable feature. For example, a user may interact with a user interface to identify a grouping of pixels (e.g., by drawing a shape around the pixels, by marking/tagging the pixels) as depicting a stable feature of a target. Other identification of stable features of target(s) depicted within the visual content is contemplated.

The multiple stable features of the target identified by the stable feature component 106 may include multiple stable parts of the target, multiple stable properties of the target, and/or other stable features of the target. The multiple stable parts of the target and/or multiple stable properties of the target that are representative of the location, size, and/or shape of the target may be identified.

Identification of the multiple stable parts of the target for application of a visual effect may include (1) identification of stable parts of the target, and (2) selection of a subset of the identified stable parts of the target for use in applying the visual effect. For example, FIG. 3 illustrates example stable parts 312, 314, 316, 318 of a target 302. The stable parts 312, 314, 316, 318 of the target 302 may include the head of the person, the forearm of the person, the rear wheel of the bicycle, and the front wheel of the bicycle. Bounding boxes for the stable parts 312, 314, 316, 318 of the target 302 may be determined. Use of other stable parts of the target is contemplated.

In some implementations, the multiple stable parts of the target for use in the application of the visual effect may be identified based on stability of distances between different stable parts of the target and/or other information. For example, after stables parts of the target are identified, the subset of the identified stable parts may be selected for use in applying the visual effect based on the stability of distances between different stable parts of the target. A distance between two stable parts of the target may refer to the length between the two stable parts depicted within the visual content (e.g., length between centers of bounding box for the stable parts), rather than the actual distance between the two stable parts in the real world. Stability of distances between different stable parts of the target may refer to how stable/unchanging are the distances between different stable parts of the target over time (over the entire progress length of the video, over one or more segments of the progress length of the video). Stable parts with the distance between them that are more stable (not changing over time, changes less over time than distances between other stable parts, changes less than a threshold amount over time) may be selected for use in applying the visual effect. Stable parts with no/smaller changes in the relative positions of the stable parts may be selected over stable parts with greater changes in the relative positions of the stable parts.

In some implementations, the multiple stable parts of the targets may be identified further based on lengths of the distances between the different stable parts of the target. For example, multiple stable parts may have stable distances to other stable parts of the target (distances between multiple stable parts do not change more than a threshold amount over time). To select among these stable parts for applying the visual effect, the lengths of the distances between the different stable parts may be used. The stable parts with longer distances between them may be selected over stable parts with shorter distances between them. For example, if two pairs of stable parts have equally stable distances between them, the pair of stable parts with longer distance between them may be selected for use in applying visual effect.

Figure 4:
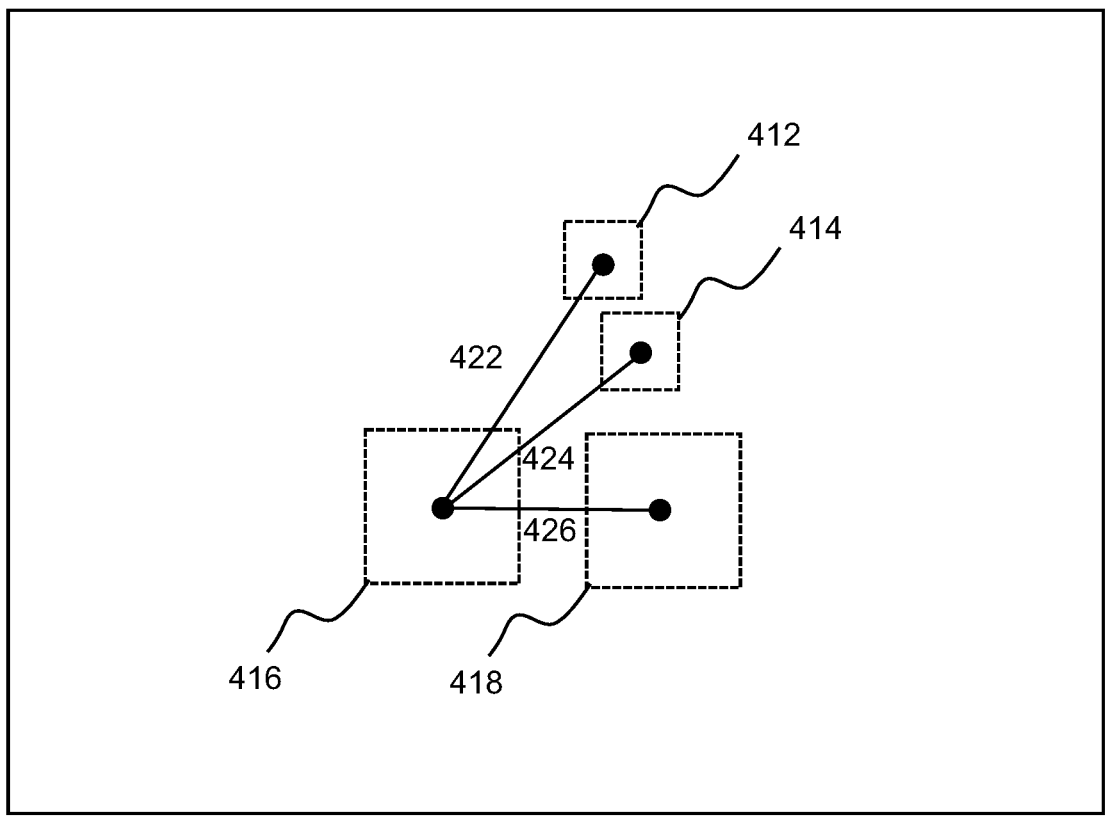
FIG. 4 illustrates example centers and distances between stable parts of a target.

FIG. 4 illustrates example centers and distances between stable parts of a target. FIG. 4 shows bounding boxes 412, 414, 416, 418 for the stable parts 312, 314, 316, 318 of the target 302 shown in FIG. 3. FIG. 4 shows centers of the bounding boxes 412, 414, 416, 418 and distances 422, 424, 426 between the bounding boxes 412, 414, 416, 418. The distances 422, 424, 426 between the bounding boxes 412, 414, 416, 418 may be analyzed over multiple frames of the video to determine whether and/or by how much the distances 422, 424, 426 changes over the multiple frames. The distance 422 may change more over the multiple frames than the distances 424, 426, and the stable parts 314, 316, 318 (corresponding to the bounding boxes 414, 416 418) may be selected over the stable part 312 (corresponding to the bound box 412). The distance 422 may change more than by a threshold amount while the distances 424, 426 may change less than the threshold amount, and the stable parts 314, 316, 318 may be selected over the stable part 312. The distance 424 may be longer than the distance 26, and the stable parts 316, 318 may be selected over the stable part 414. In this example, the hierarchical selection of stable parts using distance stability and distance length may reduce the number of stable parts used for applying visual effect from four to three, and from tree to two. Selection of other number of stable parts for use in applying visual effect is contemplated.

Figure 5:
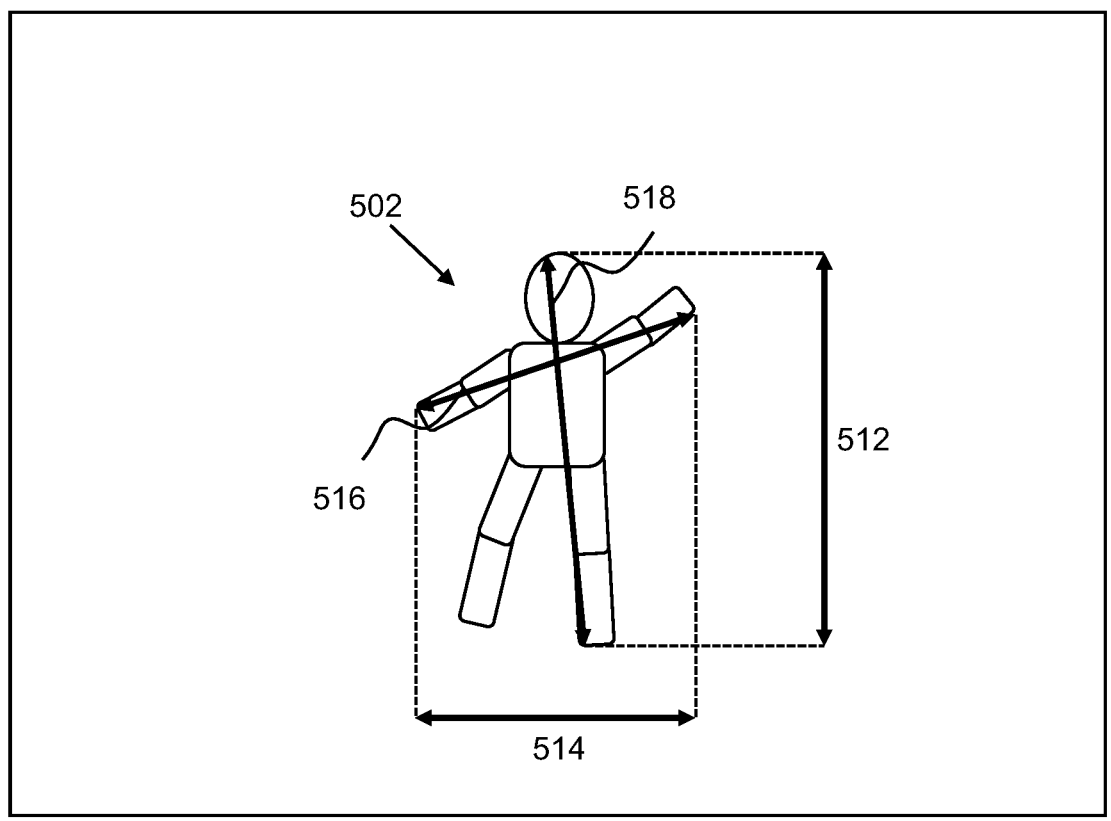
FIG. 5 illustrates example dimensions of a target.

In some implementations, the multiple stable properties of the target may include multiple dimensions of the target, such as a vertical dimension, a horizontal dimension, a top-bottom bound dimension, a left-right bound dimension, and/or other dimension of the target. FIG. 5 illustrates example dimensions of a target 502. A vertical dimension 512 of the target 502 may refer to the height between the top and bottom pixels depicting the target. A horizontal dimension 514 of the target 502 may refer to the width between left and right most pixels depicting the target. A top-bottom bound dimension 518 refer to the distance between the top and bottom pixels depicting the target. A left-right bound dimension 516 may refer to the distance between the left and right most pixels depicting the target.

Stability of the dimensions of the target may be used to determine which dimensions of the target will be used for applying the visual effect. Stability of the dimensions of the target may refer to how stable/unchanged are the dimensions of the target over time (over the entire progress length of the video, over one or more segments of the progress length of the video). The dimensions of the target may be measured over time, and the dimensions of the target that are more stable (not changing, changing less over time than other dimensions, changes less than a threshold amount over time) may be selected for use in applying the visual effect. The dimensions of the target with no/smaller changes may be selected over dimensions of the target with greater changes. For example, to determine the size of the target, the stable dimensions to be used in applying visual effect may include selection between the horizontal dimension and the left-right bound dimension based on which of these dimensions are more stable over time, and selection between the vertical dimension and the top-bottom bound dimension based on which of these dimensions are more stable over time. Other selection of dimensions of the target is contemplated.

The multiple stable properties of the target may further include a center of the target. The center of the target may refer to average position of pixels depicting the target. For example, segmentation may be applied to identify pixels of the frames depicting the target, and the dimensions and center of the segmented pixels may be identified for use as stable features.

The visual effect component 108 may be configured to apply one or more visual effects to the visual content. The visual content that is modified by a visual effect may be referred to as modified visual content. Application of a visual effect to the visual content may include modification of the original visual content using the visual effect and/or generation of new visual content using the visual effect. A visual effect may be applied to a video frame to modify the video frame. A visual effect may be applied to a video frame to generate a new video frame with the applied visual effect.

A visual effect may refer to manipulation of visual content that changes one or more characteristics of the visual content. A visual effect may change one or more visual characteristics of the visual content, one or more temporal characteristics of the visual content, and/or other characteristics of the visual content. For example, a visual effect may change pixels values of the visual content, whether and how the visual content is distorted, the spatial extents of the visual content that is presented, the speed with which the visual content is played (e.g., slow-down effect, speed-up effect), and/or other characteristics of the visual content.

For example, a visual effect may include a dolly zoom effect, a stabilization effect, and/or other effect. The dolly zoom effect may change the field of view of the visual content that is presented (e.g., shown on an electronic display, included within a video frame) while keeping the target static within the presentation. The dolly zoom effect may maintain size and/or position of the target(s) across multiple frames of the video while changing field of view of the scene depicted across the multiple frames of the video. Application of the dolly zoom effect may result in the target appearing to stay in the same position without changing size while other portions of the visual content appearing to be squeezed or stretched. For example, the amount of the field of view of the visual content being presented may be increased (simulating zooming out) while increasing the size of the target to maintain the position and/or the size of the target within the video frames. As another example, the amount of the field of view of the visual content being presented may be decreased (simulating zooming in) while decreasing the size of the target to maintain the position and/or the size of the target within the video frames.

The stabilization effect may reduce the amount of motion within the visual content that is presented. The stabilization effect may remove shakes and/or jitters from the visual content that is presented. The stabilization effect may simulate the visual content having been captured with the image capture device maintaining its relative position with respect to the target. The stabilization effect may maintain size and/or position of the target(s) across multiple frames of the video. The stabilization effect may punchout smaller extents of the visual content such that the size and/or position of the target(s) remain the same/no not change more than a threshold amount across multiple frames of the video. Application of the stabilization effect may result in stabilized depiction of the target(s) across multiple frames of the video. Use of other visual effects is contemplated.

A visual effect may be applied to the visual content based on the multiple stable features of the target(s) and/or other information. The multiple stable features of the target(s) may be used to determine how the visual effect is applied to the visual content. The multiple stable features of the target(s) may be used to determine where within the visual content the visual effect is applied. The multiple stable features of the target(s) may be used to determine the location and/or size of the target zone(s) of the visual content to which the visual effect is applied. For example, with respect to the dolly zoom effect, multiple stable features of a target may be used to identify a target zone within the visual content that should appear to be static (not chaining in position and/or size) while other extents of the visual content are being squeezed or stretched. With respect to the stabilization effect, multiple stable features of a target may be used to identify a target zone around which the video should be stabilized.

For example, with respect to stable parts of a target, middle of the stable parts of the target may be used as the center of the target zone (subject center) to anchor the visual effect for the target. For instance, the middle of segments joining centers of bounding boxes for the stable parts may be used as the center of the target zone to anchor the visual effect. The distance between the stable parts of the target may be used as the size of the target zone. For instance, the norm/magnitude of the segments joining the centers of bounding boxes for the stable parts may be used as the size of the target zone (subject size) or to determine the size of the target zone. The positions of the stable parts of the target may be used to determine the shape of the target zone. For instance, the shape of the outer boundary of the target zone may be determined based on locations of the stable parts of the target.

As another example, with respect to stable properties of a target, the center may be used as the center of the target zone to anchor the visual effect for the target. For instance, the average of pixel positions of the target may be used as the center of the target zone to anchor the visual effect. The magnitude of the stable dimensions may be used as the size of the target zone. For instance, the vertical dimension, the horizontal dimension, the top-bottom bound dimension, and/or the left-right bound dimension of the target may be used as the size of the target zone or to determine the size of the target zone. The stable dimensions of the target may be used to determine the shape of the target zone. For instance, the shape of the outer boundary of the target zone may be determined based on the vertical dimension, the horizontal dimension, the top-bottom bound dimension, and/or the left-right bound dimension of the target. Other use of the multiple stable features of the target(s) for application of visual effect is contemplated.

In some implementation, the modified visual content may be generated as an encoded video (e.g., an encoded video file). For example, the modified visual content may be generated as an encoded and stored in a particular video clip, and the video clip may be opened in a video player for presentation. In some implementations, the modified visual content may be generated as instruction identifying/defining how the visual content is to be presented on playback. For example, the modified visual content may be generated as a set of instruction identifying the visual effect to the applied and how the visual effect is to be applied to the visual content. A video play use the instructions to apply the visual effect during visual content playback.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented.

The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
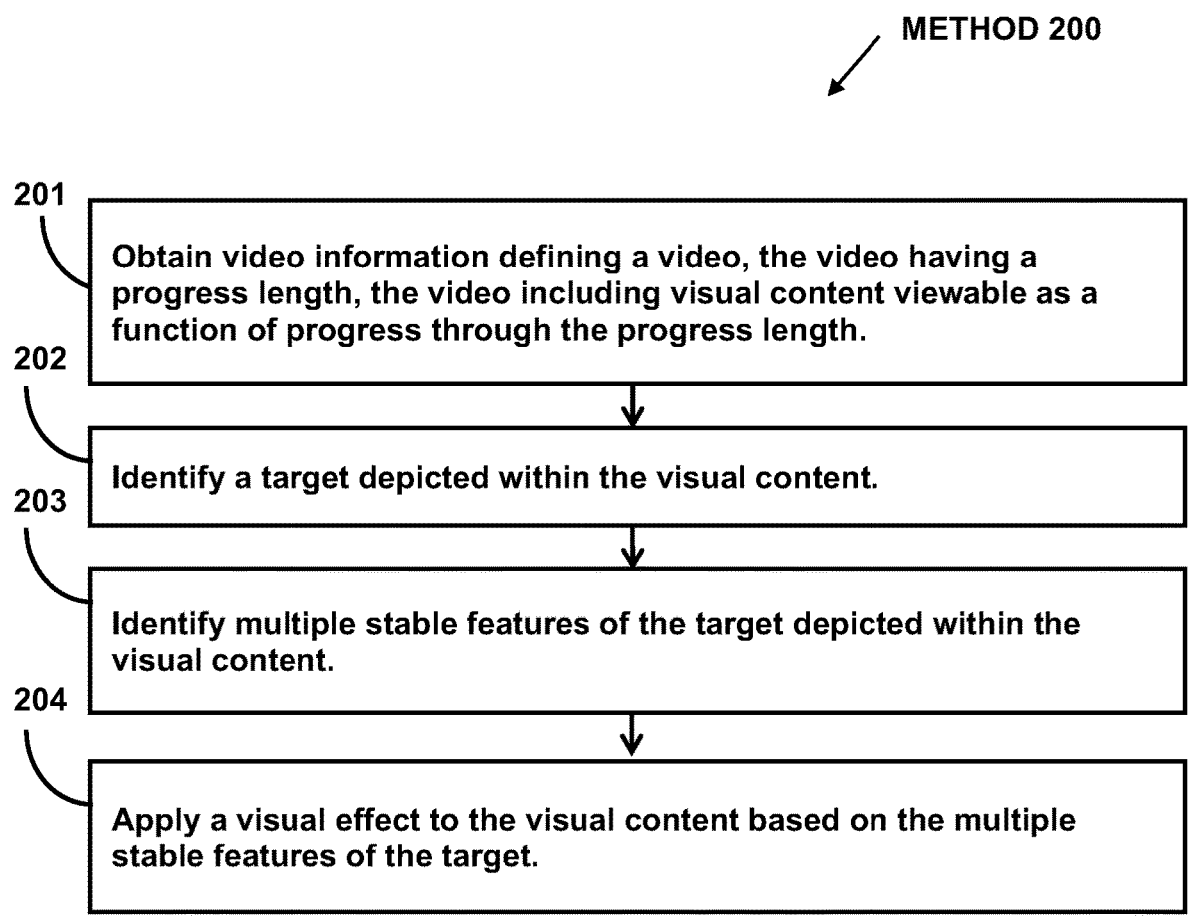
FIG. 2 illustrates a method for identifying visual features for applying effects.

FIG. 2 illustrates method 200 for identifying visual features for applying effects. The operations of method 200 presented below are intended to be illustrative. In some implementations, method 200 may be accomplished with one or more additional operations not described, and/or without one or more of the operations discussed. In some implementations, two or more of the operations may occur simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage mediums. The one or more processing devices may include one or more devices configured through hardware, firmware, and/or software to be specifically designed for execution of one or more of the operations of method 200.

Referring to FIG. 2 and method 200, at operation 201, video information and/or other information may be obtained. The video information may define a video. The video may have a progress length. The video may include visual content viewable as a function of progress through the progress length. In some implementations, operation 201 may be performed by a processor component the same as or similar to the video component 102 (Shown in FIG. 1 and described herein).

At operation 202, a target depicted within the visual content may be identified. In some implementations, operation 202 may be performed by a processor component the same as or similar to the target component 104 (Shown in FIG. 1 and described herein).

At operation 203, multiple stable features of the target depicted within the visual content may be identified. In some implementations, operation 203 may be performed by a processor component the same as or similar to the stable feature component 106 (Shown in FIG. 1 and described herein).

At operation 204, a visual effect may be applied to the visual content based on the multiple stable features of the target and/or other information. In some implementations, operation 204 may be performed by a processor component the same as or similar to the visual effect component 108 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for identifying visual features for applying effects, the system comprising:
   one or more physical processors configured by machine-readable instructions to:
      obtain video information defining a video, the video having a progress length, the video including visual content viewable as a function of progress through the progress length;
      identify a target depicted within the visual content;
      analyze the visual content at different moments within the progress length of the video to select multiple stable features of the target depicted within the visual content, a given feature of the target selected as a given stable feature of the target based on the given feature not changing or deforming more than a threshold amount over time within the video, wherein different stable features of the target are tracked independently for the different moments within the progress length of the video, wherein the multiple stable features of the target include multiple stable properties of the target and/or multiple stable parts of the target; and
      apply a visual effect to the visual content based on the multiple stable features of the target.

2. The system of claim 1, wherein:
   the multiple stable properties of the target include a center of the target and a vertical dimension, a horizontal dimension, a top-bottom bound dimension, and/or a left-right bound dimension of the target, further wherein a first dimension of the target is selected over a second dimension of the target based on an amount of changes or deformation of the first dimension of the target over time within the video being less than an amount of changes or deformation of the second dimension of the target over time within the video; and
   the multiple stable parts of the target are selected based on stability of distances between different stable parts of the target and lengths of the distances between the different stable parts of the target, the stability of distance between a pair of stable parts of the target including an extent to which a distance of the pair of stable parts of the target depicted within the visual content changes over time within the video;
   further wherein:
      first stable parts of the target with smaller changes in distances between the first stable parts are selected over second stable parts of the target with greater changes in distances between the second stable parts; and
      a first pair of stable parts is selected over a second pair of stable parts based on a first distance between the first pair of stable parts being longer than a second distance between the second pair of stable parts.

3. A system for identifying visual features for applying effects, the system comprising:
   one or more physical processors configured by machine-readable instructions to:
      obtain video information defining a video, the video having a progress length, the video including visual content viewable as a function of progress through the progress length;
      identify a target depicted within the visual content;
      analyze the visual content at different moments within the progress length of the video to select multiple stable features of the target depicted within the visual content, a given feature of the target selected as a given stable feature of the target based on the given feature not changing or deforming more than a threshold amount over time within the video, wherein different stable features of the target are tracked independently for the different moments within the progress length of the video; and
      apply a visual effect to the visual content based on the multiple stable features of the target.

4. The system of claim 3, wherein the visual effect includes a dolly zoom effect.

5. The system of claim 4, wherein the visual content includes depiction of a scene including the target and the dolly zoom effect maintains size and/or position of the target across multiple frames of the video while changing field of view of the scene depicted across the multiple frames of the video.

6. The system of claim 3, wherein the multiple stable features of the target include multiple stable properties of the target.

7. The system of claim 6, wherein the multiple stable properties of the target include a vertical dimension, a horizontal dimension, a top-bottom bound dimension, and/or a left-right bound dimension of the target, further wherein a first dimension of the target is selected over a second dimension of the target based on an amount of changes or deformation of the first dimension of the target over time within the video being less than an amount of changes or deformation of the second dimension of the target over time within the video.

8. The system of claim 7, wherein the multiple stable properties of the target further include a center of the target.

9. The system of claim 3, wherein the multiple stable features of the target include multiple stable parts of the target.

10. The system of claim 9, wherein the multiple stable parts of the target are selected based on stability of distances between different stable parts of the target, the stability of distance between a pair of stable parts of the target including an extent to which a distance of the pair of stable parts of the target depicted within the visual content changes over time within the video, further wherein first stable parts of the target with smaller changes in distances between the first stable parts are selected over second stable parts of the target with greater changes in distances between the second stable parts.

11. The system of claim 10, wherein the multiple stable parts of the targets are selected further based on lengths of the distances between the different stable parts of the target, further wherein a first pair of stable parts is selected over a second pair of stable parts based on a first distance between the first pair of stable parts being longer than a second distance between the second pair of stable parts.

12. A method for identifying visual features for applying effects, the method performed by a computing system including one or more processors, the method comprising:
  obtaining, by the computing system, video information defining a video, the video having a progress length, the video including visual content viewable as a function of progress through the progress length;
  identifying, by the computing system, a target depicted within the visual content;
  analyzing, by the computing system, the visual content at different moments within the progress length of the video to select multiple stable features of the target depicted within the visual content, a given feature of the target selected as a given stable feature of the target based on the given feature not changing or deforming more than a threshold amount over time within the video, wherein different stable features of the target are tracked independently for the different moments within the progress length of the video; and
  applying, by the computing system, a visual effect to the visual content based on the multiple stable features of the target.

13. The method of claim 12, wherein the visual effect includes a dolly zoom effect.

14. The method of claim 13, wherein the visual content includes depiction of a scene including the target and the dolly zoom effect maintains size and/or position of the target across multiple frames of the video while changing field of view of the scene depicted across the multiple frames of the video.

15. The method of claim 12, wherein the multiple stable features of the target include multiple stable properties of the target.

16. The method of claim 15, wherein the multiple stable properties of the target include a vertical dimension, a horizontal dimension, a top-bottom bound dimension, and/or a left-right bound dimension of the target, further wherein a first dimension of the target is selected over a second dimension of the target based on an amount of changes or deformation of the first dimension of the target over time within the video being less than an amount of changes or deformation of the second dimension of the target over time within the video.

17. The method of claim 16, wherein the multiple stable properties of the target further include a center of the target.

18. The method of claim 12, wherein the multiple stable features of the target include multiple stable parts of the target.

19. The method of claim 18, wherein the multiple stable parts of the target are selected based on stability of distances between different stable parts of the target, the stability of distance between a pair of stable parts of the target including an extent to which a distance of the pair of stable parts of the target depicted within the visual content changes over time within the video, further wherein first stable parts of the target with smaller changes in distances between the first stable parts are selected over second stable parts of the target with greater changes in distances between the second stable parts.

20. The method of claim 19, wherein the multiple stable parts of the targets are selected further based on lengths of the distances between the different stable parts of the target, further wherein a first pair of stable parts is selected over a second pair of stable parts based on a first distance between the first pair of stable parts being longer than a second distance between the second pair of stable parts.

\* \* \* \* \*